UNITED STATES PATENT OFFICE.

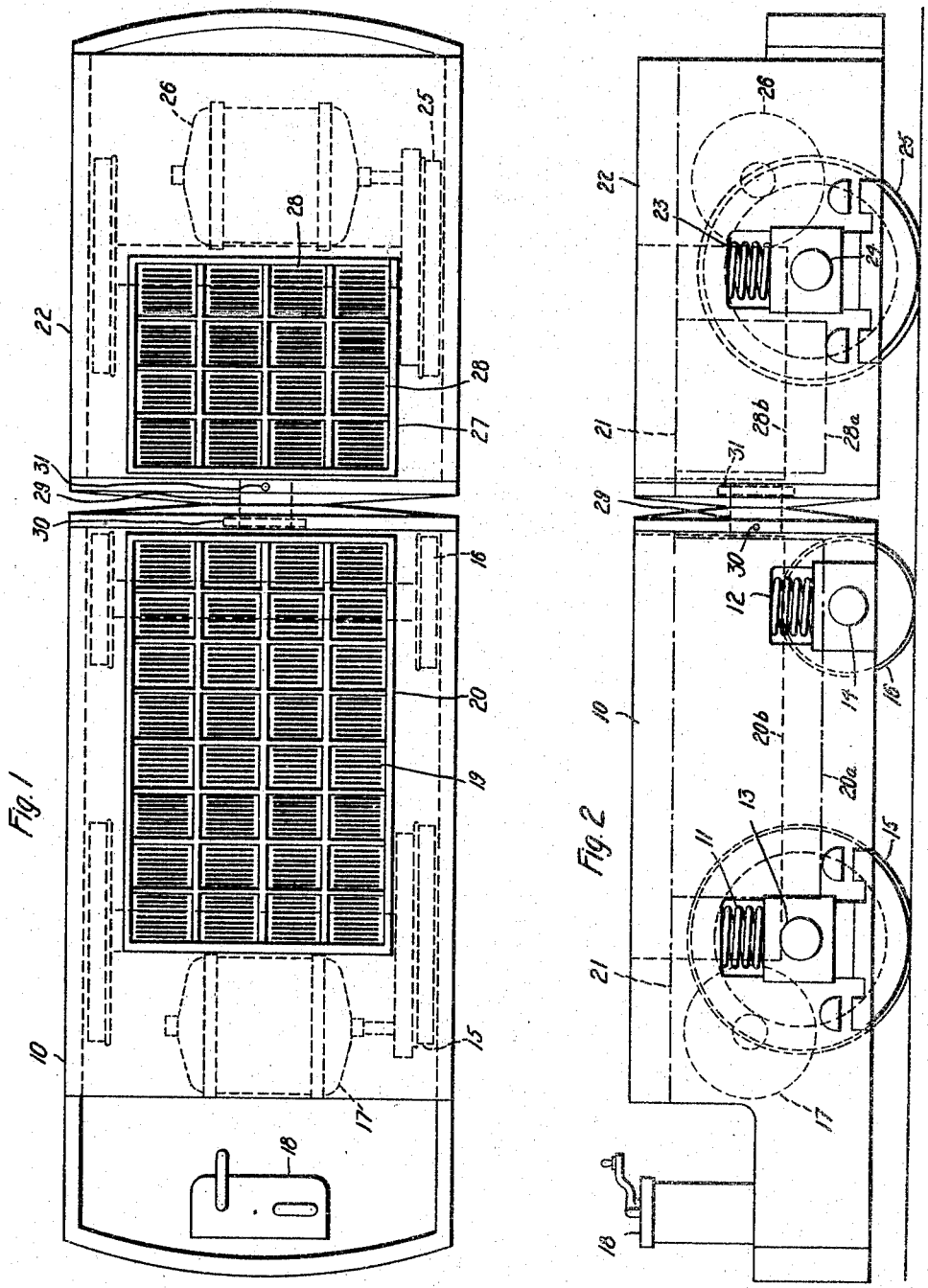

PETER P. COOPER, OF PHILADELPHIA, PENNSYLVANIA, ASSIGNOR TO WESTINGHOUSE ELECTRIC AND MANUFACTURING COMPANY, A CORPORATION OF PENNSYLVANIA.

STORAGE-BATTERY LOCOMOTIVE.

1,308,045. Specification of Letters Patent. Patented July 1, 1919.

Application filed January 14, 1918. Serial No. 211,777.

*To all whom it may concern:*

Be it known that I, PETER P. COOPER, a citizen of the United States, and a resident of Philadelphia, in the county of Philadelphia and State of Pennsylvania, have invented a new and useful Improvement in Storage-Battery Locomotives, of which the following is a specification.

This invention relates to electric locomotives and more particularly to a low-height jointed six-wheel storage-battery locomotive adapted for use in mines, industrial plants and similar places.

In low-height locomotives heretofore known, the driving motors have been suspended in the space between the axles, usually disposed at the same height above the rails. In this form of construction, most of the space above and between the axles is occupied by motors and gearing, and it becomes necessary to place the storage batteries above the driving mechanism. Such a construction is undesirable in many places because it increases the height of the locomotive beyond a permissible maximum.

The object of my invention is to provide a storage-battery locomotive in which the storage batteries, motors and associated parts are so arranged that the height of the locomotive above the rails may be considerably reduced below the minimum formerly attainable, and also to provide a construction in which the height may be varied between comparatively wide limits to suit the needs of different users.

Another object of this invention is to provide an improved locomotive construction that has a wide range of utility. The ordinary four-wheel locomotive is of sufficient capacity for some purposes but, heretofore, when a locomotive of greater capacity was desired, it was necessary to use a six-wheel rigid-frame locomotive. In order to overcome the necessity of providing an additional locomotive, I have devised an auxiliary storage-battery motor section which may be coupled to the ordinary four-wheel storage-battery locomotive to form a jointed six-wheel storage-battery locomotive having substantially the same capacity as the ordinary six-wheel rigid-frame locomotive and being superior thereto in several respects.

The above and other objects and the novel features of my invention will be apparent from the following description taken in connection with the accompanying drawing which forms a part of this application and in which Fig. 1 is a plan view of a locomotive embodying my invention, and Fig. 2 is a side elevation of the same.

Referring to the drawing, the low-height main body section 10 of the locomotive is mounted on springs 11 and 12 carried by the driver axle 13 and the trailer axle 14, respectively. The driver axle 13 is located near the front end of the locomotive frame 10 and is mounted on the driver wheels 15, and the trailer axle 14, which is considerably lower than the axle 13, is located near the rear end of the body 10 and is mounted on a pair of trailer wheels 16. The driver wheels 15 are driven by an electric motor 17, which is suspended on the body part 10 outside of the space between the axles 13 and 14 and in front of the axle 13, and is connected to the driver wheels by suitable gearing. A controller 18, on the front end of the body 10, controls the operation of the motor 17 and the supply of current thereto.

Current is supplied to the motor 17 from storage batteries 19 which are contained in a storage-battery compartment 20 that occupies most of the space in the body 10 above and between the axles 13 and 14 and between the pair of wheels within opposite sides of the body 10. Heretofore, the space between the axles 13 and 14 has been occupied by driving mechanism, but, by placing the motor 17 outside, and in front, of the axle 13, this space is made available for a storage-battery compartment, which may even be of greater size than the storage-battery compartment formerly employed. In this construction, it will be noted that the bottom of the storage-battery compartment extends well below the plane of the top of the driving motor 17, its lower limit being the height of the trailer axle 14. The storage-battery compartment, located in this manner, is shown in dot-and-dash lines in Fig. 2 of the drawing, the width and capacity, of course, being substantially the same as the width of the storage-battery compartment placed higher on the body, as shown in dash lines. The higher battery compartment also extends well below the plane of the top of the casing of the motor 17 but the bottom of it is disposed in a plane about level with the top of the driver axle. In the former arrangement, the height of the locomotive is dependent on the diameter of the trailer wheels, and, in the drawing, this height is indicated by the dot and dash line 21. The height of the locomotive may be increased as desired.

The auxiliary motor section consists of a body part 22 which is substantially of the same size, in transverse section, as the body part 10 but is preferably shorter than the latter. The body part 22 is mounted on springs 23 which are supported at the opposite ends of a driver axle 24 carried by a pair of driving wheels 25. An electric motor 26 is suspended on the frame 22 behind the axle 24 and is geared to the driver wheels 25. The operation of the electric motor 26 and the supply of current thereto may be controlled by suitable connections, (not shown), from the controller 18.

Current for the electric motor 26 may be supplied by storage batteries 27 contained in the storage-battery compartment 28 located in the auxiliary body 22 in the space in front of, and above, the axle 24 and between the wheels 25. By suspending the electric motor 26 behind the axle 24, the storage-battery compartment 28 may be positioned close to the compartment 20 so that the connections between the batteries in the two compartments may be made with greater facility. In the auxiliary body section, as in the main body section, the storage-battery space is of suitable dimensions for the amount of power required and the dot-and-dash line 21' indicates the minimum height of the body part 22 to correspond to the minimum height 21 of the main body part 10, since the two body parts are substantially alike in transverse outline.

For some purposes, the four-wheel main section of the locomotive is of sufficient capacity and is used without the auxiliary section 22. Where the requirements are for a locomotive of greater capacity, two sections are coupled together in abutting relation, as indicated in the drawing. The coupling connection between the two body sections consists of a bar 29 which fits in sockets in the abutting ends of the two sections and is pivotally connected to the main section by a horizontal pin 30 and to the auxiliary section by a vertical pin 31 to form a suitable flexible connection so that the two body sections may assume angular positions with relation to each other and still maintain their abutting relation, the abutting ends of the two sections being shaped as illustrated, leaving sufficient clearance at the edges to permit this angular movement. This flexible connection between the two sections of the locomotive to form a jointed six-wheel locomotive is clearly illustrated, described and claimed in my copending application.

Where a locomotive of greater capacity is desired, an eight-wheel jointed locomotive may be formed by attaching a self-contained two-wheel auxiliary motor section to each end of the four-wheel main motor section or a single two-wheel motor section to a rigid six-wheel locomotive, the parts being articulated together in the same manner as in the six-wheel locomotive illustrated. The main and auxiliary sections may be controlled from a single controller mounted at any desirable place but, for the sake of clearness, the electrical connections of both batteries to this controller are not shown.

While I have described and claimed my improved locomotive in detail, it is to be understood that numerous features of the construction may be varied without departing from the spirit and scope of my invention.

I claim as my invention:

1. In a locomotive, the combination with a four-wheel main section equipped with motive means, of a two-wheel auxiliary section equipped with motive means, power-storing means on each of said sections and a coupling means for connecting said sections.

2. In a jointed six-wheel mining and industrial locomotive, the combination with a two-axle four-wheel main section equipped with motive means disposed in front of the space between the axles, of a single-axle two-wheel auxiliary section equipped with motive means disposed behind said single axle, a power-storing compartment on said main section behind the motive means thereof, a power-storing compartment on said auxiliary section in front of the motive means thereof, and coupling means for connecting said sections.

3. In an electric locomotive, the combination with a four-wheel main section equipped with electromotive means, of a two-wheel auxiliary section equipped with electromotive means, a storage-battery compartment on each of said sections, and a coupling means for connecting said sections.

4. In a low-height jointed six-wheel storage-battery locomotive, the combination with a comparatively low four-wheel main body section, a comparatively low two-wheel auxiliary body section, a storage-battery compartment on each of the body sections, an electric propelling motor on each of said body sections, and coupling means for flexibly connecting said sections.

5. In a low-height jointed storage battery locomotive, the combination with a low-height main body section provided with running gear comprising a driver axle, a trailer axle, and driver and trailer wheels mounted on said respective axles, an electric motor mounted on said body outside the space between said axles, a storage-battery compartment on the body above the trailer axle and extending below the plane of the top of said motor, an auxiliary body section having running gear comprising a single axle and a pair of driver wheels, an electric driving motor mounted on said auxiliary body section, a storage-battery compartment on the auxiliary body extending below the plane of the top of the driving motor, and a coupling means for flexibly connecting said body sections.

6. In a low-height jointed six-wheel storage-battery locomotive, the combination with a main body, of running gear therefor comprising a driver axle and a trailer axle lower than the driver axle, driver and trailer wheels mounted on said respective axles, an electric driving motor mounted on said body and operatively connected to said driver wheels and disposed outside the space between said axles, a storage-battery compartment on the body above the trailer axle and extending below the plane of the top of the driving motor and occupying most of the space between and above said axles, an auxiliary body section, running gear therefor comprising a single axle and a single pair of driver wheels mounted on said axle, an electric motor mounted on said auxiliary body behind said single axle, a storage-battery compartment on said auxiliary body extending below the plane of the top of said last named driving motor and occupying most of the space of said auxiliary body in front of and above said single axle, and a coupling means for flexibly connecting said sections.

7. In an electric locomotive of the class described, the combination with a low-height main body part equipped with a two-axle four-wheel running gear comprising a driver axle, a trailer axle lower than the driver axle, driver and trailer wheels mounted on said respective axles, an electric motor mounted on said main body part in front of said driver axle and operatively connected to said driver wheels, a storage-battery compartment behind the said driving motor and extending below the plane of the top of said motor and occupying most of the space in said main body between, and above, said axles, an auxiliary body part of substantially the same size, in transverse section, as the main body part but shorter than the latter, a single axle on said auxiliary body part, driver wheels on said single axle, an electric motor behind said single axle and operatively connected to said driver wheels, a storage-battery compartment in front of the electric motor and extending below the plane of the top of said motor and occupying most of the space in said body in front of, and above, said single axle, the adjacent ends of said body parts being in abutting relation and so shaped as to permit free lateral motion of one body part with relation to the other while maintaining the abutting relation, and coupling means for flexibly connecting the body parts together.

8. In an auxiliary motor section adapted to be coupled to a locomotive, the combination with a body, of a single axle and a pair of driver wheels for supporting the same, propelling means mounted on said body and disposed behind said axle, a storage-battery compartment mounted on said body in front of said axle, and means whereby said body may be flexibly coupled to a locomotive.

9. In an auxiliary motor section adapted to be coupled to a locomotive, the combination with a body, of a single axle and a pair of driver wheels for supporting the same, an electric driving motor connected to said driving wheels and disposed behind said axle, a storage-battery compartment mounted on said body in the space in front of said driving motor and extending below the plane of the top of the latter, and means whereby said body may be flexibly coupled to a locomotive body.

10. In an auxiliary unitary motor section adapted to be coupled to a locomotive, the combination with a body having one end thereof equipped with coupling means and shaped to adapt it to maintain abutting relation with a similarly shaped main motor section to which it may be coupled, of a single axle and a pair of driver wheels for supporting the said body, an electric driving motor connected to said driving wheels and disposed on the side of said axle away from said coupling end, and a storage-battery compartment mounted on said body in the space between said motor and the coupling end of said body.

In testimony whereof, I have hereunto subscribed my name this 27th day of December, 1917.

PETER P. COOPER.